April 12, 1927. W. D. BARNARD 1,624,033
WEED KILLER
Filed Oct. 17, 1925 2 Sheets-Sheet 1
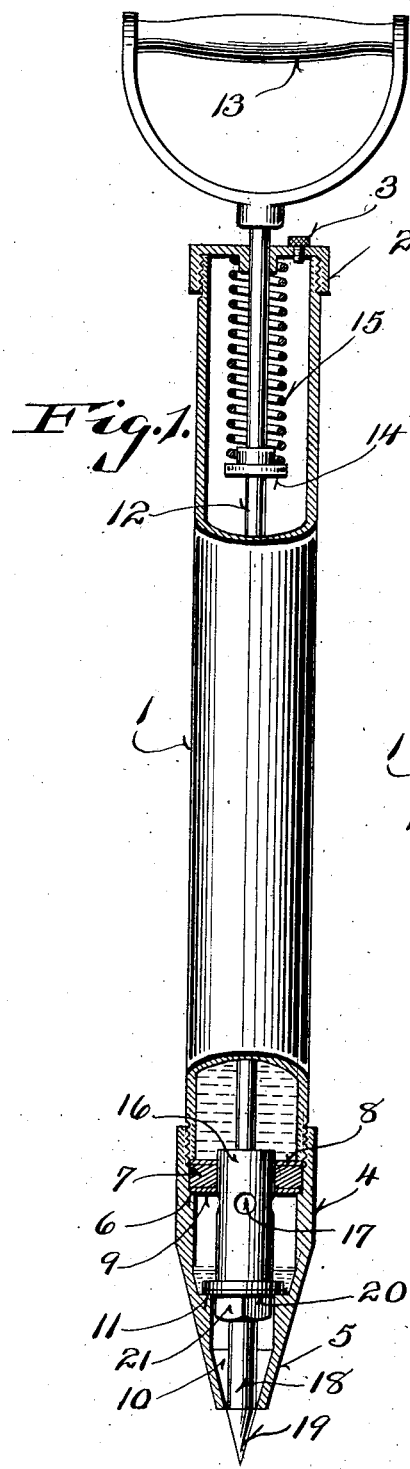
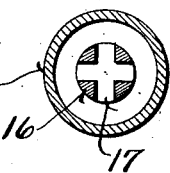
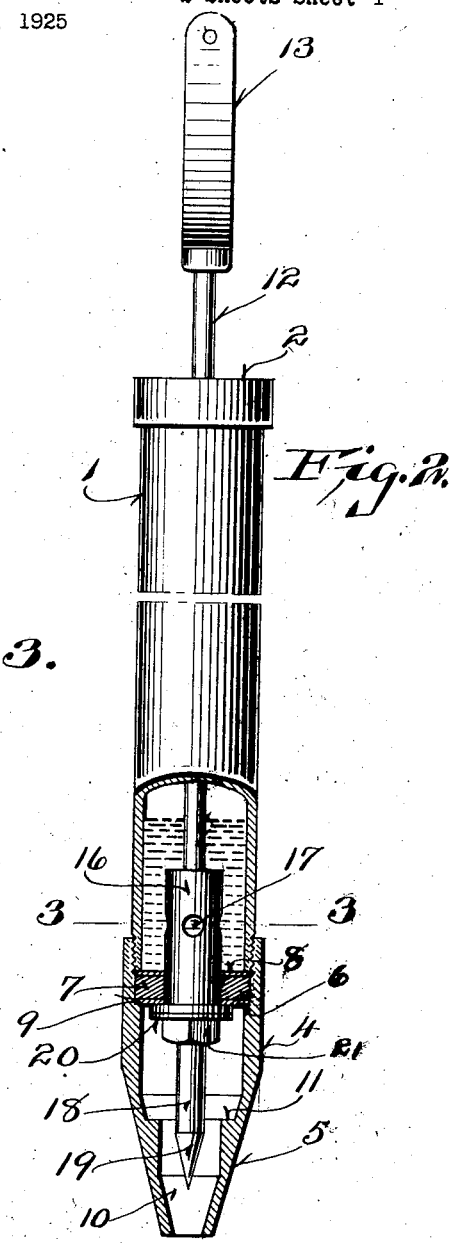
Inventor
Wilbur D. Barnard April 12, 1927.  W. D. BARNARD  1,624,033
WEED KILLER
Filed Oct. 17, 1925  2 Sheets-Sheet 2

Inventor
Wilbur D. Barnard

Patented Apr. 12, 1927.

1,624,033

UNITED STATES PATENT OFFICE.

WILBUR DEAN BARNARD, OF NEENAH, WISCONSIN.

WEED KILLER.

Application filed October 17, 1925. Serial No. 63,074.

This invention relates to weed killers.

Objects of this invention are to provide a weed killer which may be used for the extermination of noxious weeds, such for instance as dandelions without disturbing the surrounding ground or the grass growing in the vicinity of the dendelion.

Objects of this invention are, therefore, to provide a device which will inject a destructive liquid into the dandelion stem or root, which will open an aperture in the root in which the intimate mixing of this solution with the juices of the dandelion or other weed is secured, and which will confine the flow of liquid to the exact area desired and apportion the liquid in measured amounts.

A further object of this invention is to provide a device which is inexpensive to make, which is reliable in operation, and which may be easily operated by an unskilled worker.

Embodiments of the invention are shown in the accompanying drawings, in which:—

Figure 1 is a side elevation of the device, such view being partly in section.

Figure 2 is a view showing the device in liquid discharging position, such view also being partly in section.

Figure 3 is a sectional view on the line 3—3 of Figure 2.

Figure 4:
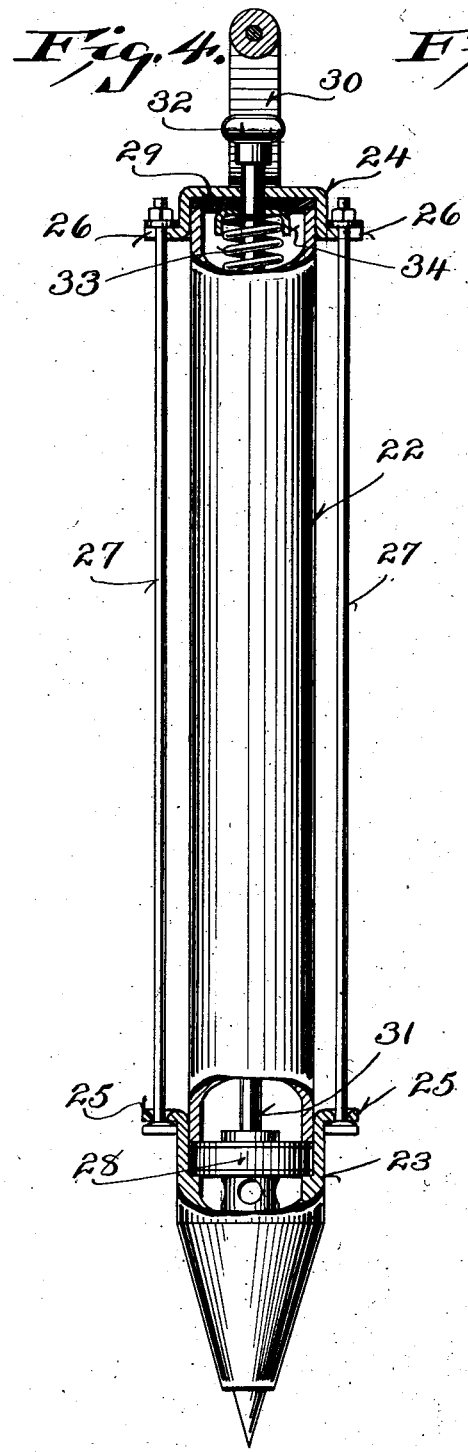
Figure 4 is a side elevation partly in section of a modified form of the invention.

Referring to the drawings, it will be seen that the device comprises an elongated drum 1 whose threaded upper end is covered by means of a cap 2 provided with a filling plug 3. The lower end of the drum 1 is threaded and receives the upper threaded end of the tip 4. This tip or nose of the device is provided with a tapered portion 5, and with a shoulder 6 adjacent its upper end. This shoulder clamps a packing 7 between a pair of washers 8 and 9. The lower portion of the tip is apertured, as indicated at 10, and is provided with an intermediate shoulder 11 for a purpose hereinafter to appear.

A rod 12 extends through the device and projects through the cap 2. It is equipped with an operating handle 13 at its upper end, and with a collar 14 intermediate its ends and within the drum 1. A coiled spring 15 loosely surrounds the rod 12 and bears at its upper end against the cap 2 and at its lower end against the collar 14. The lowermost end of the rod carries a plunger 16 which slides through the packing 7 and is provided with a plurality of transverse apertures 17 which act as measuring chambers for the charge.

Figure 3 shows the arrangement of this part of the apparatus with greater detail.

The lower end of the device is provided with a smaller plunger 18 having a pointed end 19 adapted to be projected through the lowest end of the tip 5. It is provided with a valve or gasket 20 held in place by means of a nut 21. This valve 20 is adapted to seat upon the shoulder 11, as shown in Figure 1, in the normal position of the apparatus.

It is to be noted that the spring 15 need not be a very heavy spring but is preferably amply sufficient to support the drum 1 when it is loaded and to hold the parts in the position shown in Figure 1, under normal conditions.

In using the device it is placed over the dandelion and the pointed end 19 is forced downwardly into the center of the dandelion thus cutting a gash in the root portion thereof and forming an indentation. Thereafter, the operator holds the barrel 1 in position and draws the rod 12 upwardly. This permits the liquid collected in the tip 4 to be discharged into the cavity made by the pointed end 19. The position of the parts are then as illustrated in Figure 2.

Further, it will be noted that the washer or valve 20 limits the upward motion of the valve 12.

When the plunger 16 is moved upwardly, the apertures 17 come up above the packing 7. The chamber formed by the intersecting apertures 17 receives its fill of liquid from the barrel 1. When the plunger 16 is moved downwardly so that the apertures come below the packing, the liquid flows out from the apertures 17 into the recess in the tip 4 above the shoulder 11. When the plunger 16 is again raised, the liquid flows out of the tip. In this manner, a measured charge of the destructive liquid is delivered at each stroke of the plunger.

Figure 5:
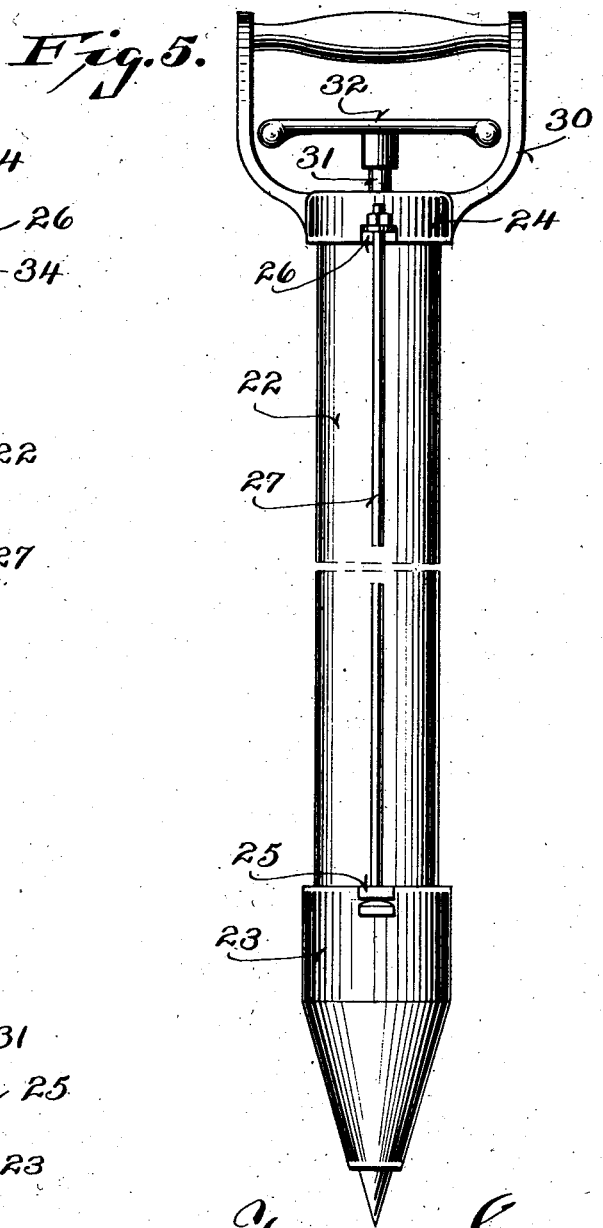
Figure 5 is a view at right angles to Figure 4.

In the form of the invention shown in Figures 4 and 5, a barrel 22 similar to the barrel 1 is employed. This barrel is not threaded into either the tip portion 23 or the cap 24. These members 23 and 24 are each provided with apertured lugs 25 and 26, it being noted that the lugs 26 are also preferably each provided with an outwardly extending slot. Tie rods 27 extend between the ears 25 and 26 and clamp the parts together. The gasket 28 is similar to the gasket 7 previously described, and the construction of tip 23 is the same as that of the tip 4, as previously described. The upper end of the tube or drum 22 is sealed by means of a gasket 29 carried within the cap 24.

In this form of the invention, the cap 24 is provided with a handle 30 and the plunger rod 31 is provided with an additional handle 32, such handle being positioned within the handle 30, previously described.

It is to be noted further that the spring 33 for forcing the plunger rod 31 downwardly is seated in a cup-shaped member 34 which is apertured for the passage of the rod 31, and which bears against the gasket 29, thus sealing the sliding joint between the rod 31 and the cap 24.

In using this device, the entire apparatus is held in position by means of the handle 30 and when it is desired to discharge liquid it is necessary merely to lift the handle 32. If desired, a filling cap may be provided similar to that previously described. However, it is found that the device may be readily filled by loosening the tie bolts 27 and moving the cap upwardly a slight distance. The operation of the tip 23 is identical with that previously described.

Thus a weed destroyer has been provided which will form an incision in the weed and which will inject measured quantities of destructive liquid into this aperture formed in the obnoxious weed, thus confining the detructive action to the exact part desired.

It will be seen further that the device is very simple in construction and may be cheaply produced. Further, it is to be noted that the device may be very rapidly and easily operated and is effective in the destruction of weeds.

Although the invention has been described in considerable detail, it is to be understood that the invention may be variously embodied and is, therefore to be limited only as claimed.

I claim:

A weed destroyer comprising an elongated barrel adapted to contain a destructive liquid, a reciprocatory rod mounted within said barrel and projecting from its upper end, an operating handle carried by said rod, a spring urging said rod downwardly, a tip carried by the lower end of said barrel and having a contracted apertured lower end, a packing interposed between a portion of said tip and the lower end of said barrel, a measuring plunger connected to the lower end of said rod and adapted to reciprocate within said packing, said measuring plunger having apertures formed therein and adapted to be filled with the destructive liquid from the interior of said barrel when located above said packing during the upward reciprocation of said plunger, and to deliver such liquid to the interior of said tip upon the downward reciprocation of said plunger, a shoulder formed inside said tip, a valve carried by said measuring plunger, and adapted to contact with said shoulder when said measuring plunger is in its lowermost position, and a pointed end projecting from said measuring plunger and adapted to be projected through the lower end of said tip or withdrawn into said tip.

In testimony that I claim the foregoing I have hereunto set my hand at Neenah, in the county of Winnebago and State of Wisconsin.

WILBUR DEAN BARNARD.